United States Patent
Totsuka et al.

(10) Patent No.: US 10,928,026 B2
(45) Date of Patent: Feb. 23, 2021

(54) VEHICLE LAMP AND METHOD OF MANUFACTURING THE SAME

(71) Applicant: Koito Manufacturing Co., Ltd., Tokyo (JP)

(72) Inventors: Takahiro Totsuka, Shizuoka (JP); Daisuke Takahashi, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 16/571,503

(22) Filed: Sep. 16, 2019

(65) Prior Publication Data

US 2020/0088371 A1 Mar. 19, 2020

(30) Foreign Application Priority Data

Sep. 19, 2018 (JP) ................................. 2018-175159

(51) Int. Cl.
| | |
|---|---|
| *F21S 41/143* | (2018.01) |
| *F21S 41/147* | (2018.01) |
| *F21S 41/19* | (2018.01) |
| *F21S 41/50* | (2018.01) |
| *F21S 41/29* | (2018.01) |
| *F21Y 115/10* | (2016.01) |
| *B29L 31/00* | (2006.01) |

(52) U.S. Cl.
CPC ............ *F21S 41/143* (2018.01); *F21S 41/147* (2018.01); *F21S 41/192* (2018.01); *F21S 41/295* (2018.01); *F21S 41/50* (2018.01); *B29L 2031/747* (2013.01); *F21Y 2115/10* (2016.08)

(58) Field of Classification Search
CPC ....... F21S 41/29; F21S 41/198; B60Q 1/0483; B60Q 1/2634
See application file for complete search history.

(56) References Cited

U.S. PATENT DOCUMENTS

| | | | | |
|---|---|---|---|---|
| 4,500,946 | A | * 2/1985 | Mikola | F21S 41/198 362/645 |
| 4,774,645 | A | * 9/1988 | Iwamoto | F21S 41/198 362/652 |
| 2016/0339834 | A1 | * 11/2016 | Oshima | F21S 41/68 |

(Continued)

FOREIGN PATENT DOCUMENTS

JP       2017-084692 A     5/2017

*Primary Examiner* — Eric T Eide
(74) *Attorney, Agent, or Firm* — Abelman, Frayne & Schwab

(57) ABSTRACT

A vehicle lamp includes: a lamp body including a light emitting source receiving port communicating with an outside of a lamp chamber; a translucent cover combined with the lamp body to form the lamp chamber in between; a light guide supported by the translucent cover, disposed in the lamp chamber, and including a light entrance portion disposed in the vicinity of the light emitting source receiving port; a light emitting source mounting portion mounted on the lamp body to close the light emitting source receiving port, and including a light emitting source disposed to face the light entrance portion; and a positioning member including a lock disposed in the light emitting source receiving port to position the light entrance portion and the light emitting element with respect to each other in a state where the light emitting source mounting portion is mounted on the lamp body.

12 Claims, 17 Drawing Sheets

(56) References Cited

U.S. PATENT DOCUMENTS

2017/0261168 A1* 9/2017 Edletzberger ............ B60Q 1/04
2018/0210127 A1* 7/2018 Akiyama ............... F21S 43/245
2019/0063706 A1* 2/2019 Feil ......................... F21S 45/47
2019/0064423 A1* 2/2019 McCarter ............... F21S 43/249
2020/0003383 A1* 1/2020 Takenaga ................ F21S 41/50

* cited by examiner

VEHICLE LAMP AND METHOD OF MANUFACTURING THE SAME

CROSS-REFERENCE TO RELATED APPLICATIONS

This application is based on and claims priority from Japanese Patent Application No. 2018-175159, filed on Sep. 19, 2018, with the Japan Patent Office, the disclosure of which is incorporated herein in its entirety by reference.

TECHNICAL FIELD

The present disclosure relates to a vehicle lamp. Particularly, the present disclosure relates to a vehicle lamp used in a vehicle such as a car. In addition, the present disclosure relates to a method of manufacturing such vehicle lamp.

BACKGROUND

In the related art, a vehicle lamp including an LED unit integrally formed with a heat dissipating unit is known. With regard to heat dissipation of the LED chip supported by the LED unit, there are two types of methods, that is, an internal heat dissipation type in which the entire LED unit is accommodated in a lamp chamber, and an external heat dissipation type in which while the LED chip is disposed in a lamp chamber, the heat dissipating unit is disposed outside the lamp chamber so that the LED unit is mounted on the body of the vehicle lamp (see, e.g., Japanese Patent Laid-Open Publication No. 2017-084692). The external heat dissipation type is advantageous over the internal heat dissipation type in order to efficiently discharge the heat generated from the LED to the outside of the lamp.

SUMMARY

A light emitting element (e.g., an LED) and an optical member (e.g., a light guide) that receives light therefrom need to be positioned with respect to each other with a predetermined positioning accuracy. In a vehicle lamp of the external heat dissipation type, a light emitting element unit including a light emitting element and a heat dissipation unit is mounted on a lamp body. Here, when a design in which the optical member is supported by a translucent cover that forms a lamp chamber by combining with the lamp body is desired, the light emitting element and the optical member are separately disposed in the lamp body and the translucent cover. In such a separated disposition of the light emitting element and the optical member, it is difficult to secure the positioning accuracy of the light emitting element and the optical member, as compared with a unitized design in which the light emitting element and the optical member are accurately positioned in advance. Meanwhile, the separated disposition is not limited to the external heat dissipation type.

The present disclosure has been made in consideration of such a circumstance, and the present disclosure is to provide a vehicle lamp capable of accurately positioning the light emitting element and the optical member.

In order to solve the above problems, a vehicle lamp according to an aspect of the present disclosure includes: a lamp body including a light emitting source receiving port communicating with an outside of a lamp chamber; a translucent cover combined with the lamp body to form the lamp chamber in between; a light guide attached to the translucent cover and disposed in the lamp chamber, and including a light entrance portion disposed in the vicinity of the light emitting source receiving port; a light emitting source mounting portion mounted on the lamp body to close the light emitting source receiving port, and including a light emitting source disposed to face the light entrance portion; and a positioning member including a lock disposed in the light emitting source receiving port to position the light entrance portion and the light emitting source with respect to each other in a state where the light emitting source mounting portion is mounted on the lamp body.

According to the aspect, it is possible to provide the vehicle lamp capable of accurately positioning the light emitting source and the light guide.

The positioning member may position the light entrance portion and the light emitting source with respect to each other in an in-plane direction parallel to a light emitting surface of the light emitting source.

The vehicle lamp may further include a holder that holds the light entrance portion. The positioning member may position the light emitting source and the positioning member with respect to each other in the in-plane direction by engagement with the light emitting source mounting portion, and positions the light entrance portion and the positioning member with respect to each other by engagement with the holder.

The positioning member may position the light entrance portion and the light emitting source with respect to each other in direction perpendicular to a light emitting surface of the light emitting source.

The vehicle lamp may further include a holder that holds the light entrance portion. The light emitting source mounting portion may be mounted on the lamp body by rotation around the perpendicular direction with respect to the light emitting source receiving port, and the positioning member may be disposed in the light emitting source receiving port so as to be rotated around the perpendicular direction together with the light emitting source mounting portion, and abut on the holder such that a rotational displacement of the positioning member is converted into a positional displacement of the light entrance portion in the perpendicular direction.

The holder may be bending deformable with respect to the translucent cover.

According to another aspect of the present disclosure, there is provided a method of manufacturing a vehicle lamp. The method of manufacturing a vehicle lamp includes: preparing a lamp body including a light emitting source receiving port communicating with an outside of a lamp chamber, a translucent cover that supports an light guide having a light entrance portion, a light emitting source mounting portion including a light emitting source, and a positioning member including a lock; attaching the translucent cover to the lamp body such that the lamp chamber is formed between the lamp body and the translucent cover, the light guide is disposed in the lamp chamber, and the light entrance portion is disposed in the vicinity of the light emitting source receiving port; disposing the positioning member in the light emitting source receiving port; and mounting the light emitting source mounting portion on the lamp body such that the light emitting source receiving port is closed and the light emitting source is disposed to face the light entrance portion. The mounting is performed such that the light entrance portion and the light emitting source are positioned with respect to each other by the positioning member.

According to the aspect, it is possible to provide the vehicle lamp capable of accurately positioning the light emitting source and the light guide.

The mounting may include rotating the light emitting source mounting portion with respect to the light emitting source receiving port and the positioning member such that the light emitting source mounting portion is engaged with the positioning member, and further rotating the light emitting source mounting portion together with the positioning member with respect to the light emitting source receiving port such that the light entrance portion and the light emitting source are positioned with respect to each other by the positioning member.

According to the present disclosure, it is possible to provide the vehicle lamp capable of accurately positioning the light emitting source and the light guide.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawings, which form a part hereof. The illustrative embodiments described in the detailed description, drawing, and claims are not meant to be limiting. Other embodiments may be utilized, and other changes may be made, without departing from the spirit or scope of the subject matter presented here.

Hereinafter, preferred exemplary embodiments of the present disclosure will be described based on the drawings. Further, the exemplary embodiments are not intended to limit the present disclosure thereto, but are merely illustrative. All features described in the exemplary embodiments or combinations thereof may not be essential for the present disclosure. Identical or corresponding components, members, and processes in each of the drawings will be denoted by the same symbols, and overlapping descriptions thereof will be appropriately omitted. In addition, a scale or a shape of each component illustrated in each of the drawings is conveniently set in order to facilitate descriptions thereof and should not be construed as being limited unless specified. In addition, for example, the terms "first" and "second" used herein or the claims are not intended to refer to any order or importance but are intended to discriminate a component from another component. In addition, a portion of members which are not important in describing the embodiment is omitted and displayed in each drawing.

Figure 1:
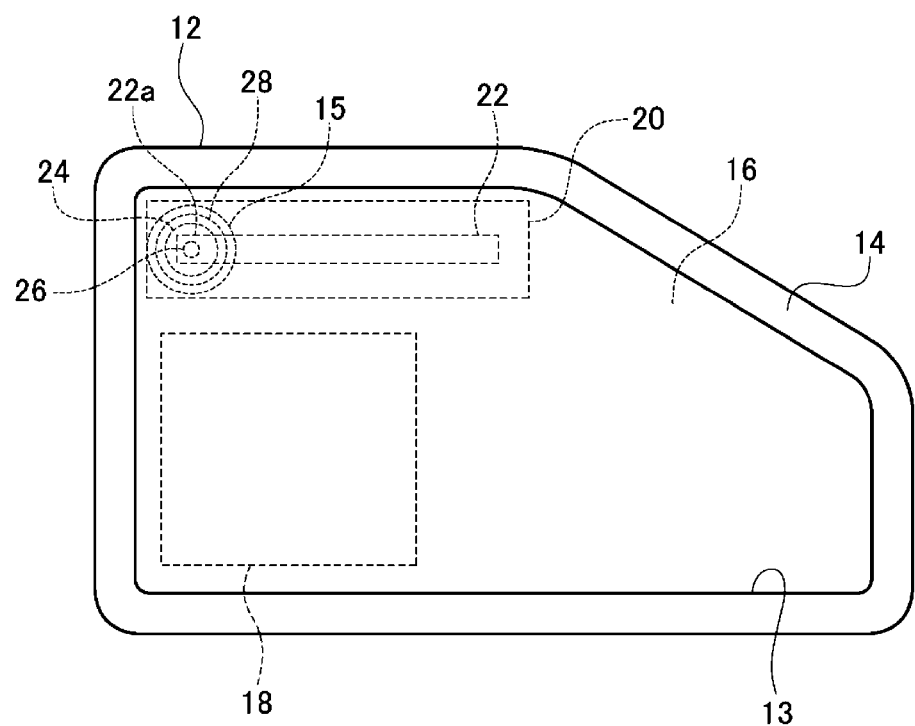
FIG. 1 is a schematic front view of a vehicle lamp according to an embodiment.

FIG. 1 is a schematic front view of a vehicle lamp 10 according to an embodiment. The vehicle lamp 10 is a vehicle headlamp device including a pair of headlamp units which are disposed at the front left and right sides of a vehicle, respectively. The pair of headlamp units has a substantially symmetrical structure, and has substantially the same configuration, and thus, FIG. 1 illustrates a vehicle lamp placed on the left side when viewed from the front of the vehicle body. Therefore, in FIG. 1, the left side is the outer side in the vehicle width direction, and the right side is the inner side in the vehicle width direction.

The vehicle lamp 10 includes a lamp body 12 having a front opening 13, and a translucent cover 14 attached to the lamp body 12 so as to cover the front opening 13. The lamp body 12 is configured to be attachable to the vehicle body, and the translucent cover 14 is attached to the vehicle body via the lamp body 12. A lamp housing is constituted by the lamp body 12 and the translucent cover 14, and an internal space of the lamp housing is formed as a lamp chamber 16. The lamp body 12 includes a light emitting element receiving port 15 communicating with an outside of the lamp chamber 16. The light emitting element receiving port 15 is formed on a back surface of the lamp body 12 as an opening separate from the front opening 13. The lamp body 12 is formed of, for example, a resin material. The front opening 13 is opened on the front side of the vehicle. The translucent cover 14 is formed of a translucent resin, glass, or the like.

The vehicle lamp 10 includes a first lamp unit 18 and a second lamp unit 20, which are disposed in the lamp chamber 16. For example, the first lamp unit 18 functions as a headlamp, and the second lamp unit 20 functions as a clearance lamp and/or a day light running lamp.

The first lamp unit 18 is attached to the lamp body 12, and the second lamp unit 20 is attached to the translucent cover 14. The second lamp unit 20 is disposed above the first lamp unit 18, and is accommodated in the upper part of the lamp chamber 16. The second lamp unit 20 is supported by the translucent cover 14, and includes a light guide 22 disposed in the lamp chamber 16. The light guide 22 includes a light guide light entrance portion 22a disposed in the vicinity of the light emitting element receiving port 15. The light guide light entrance portion 22a is a tip of the light guide 22.

Although the details will be described later, the vehicle lamp 10 includes a light emitting element mounting portion 24 mounted on the lamp body 12 so as to close the light emitting element receiving port 15. The light emitting element mounting portion 24 is configured to provide external heat dissipation to the vehicle lamp 10 (specifically, the second lamp unit 20). The light emitting element mounting portion 24 includes one or a plurality of light emitting elements 26 disposed to face the light guide light entrance portion 22a. The light emitting element mounting portion 24 is configured to support the light emitting element 26 serving as a light source of the second lamp unit 20, and to be removably mounted in the light emitting element receiving port 15, and is referred to as, for example, a LED socket or an LED module.

In addition, the vehicle lamp 10 includes a positioning member 28 disposed in the light emitting element receiving port 15, so as to position the light guide light entrance portion 22a and the light emitting element 26 with respect to each other in a state where the light emitting element mounting portion 24 is mounted on the lamp body 12. The positioning member 28 positions the light guide light entrance portion 22a and the light emitting element 26 with respect to each other in an in-plane direction parallel to a light emitting surface of the light emitting element 26. The in-plane direction parallel to the light emitting surface of the light emitting element 26 (hereinafter, also referred to simply as the "in-plane direction") may be, for example, a radial direction or a circumferential direction of the light emitting element receiving port 15, or both. The positioning member 28 positions the light guide light entrance portion 22a and the light emitting element 26 with respect to each other in a direction perpendicular to a light emitting surface of the light emitting element 26 (hereinafter, also referred to as an "optical axis direction"). Further details of the positioning member 28 will be also described later.

Figure 2A:
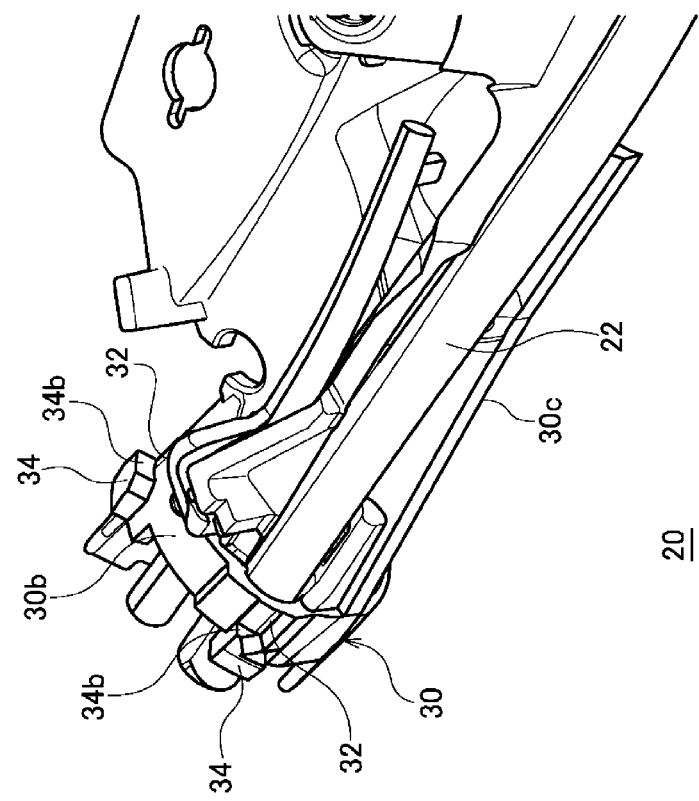
FIGS. 2A and 2B are schematic perspective views illustrating a portion of a second lamp unit according to an embodiment.
Figure 2B:
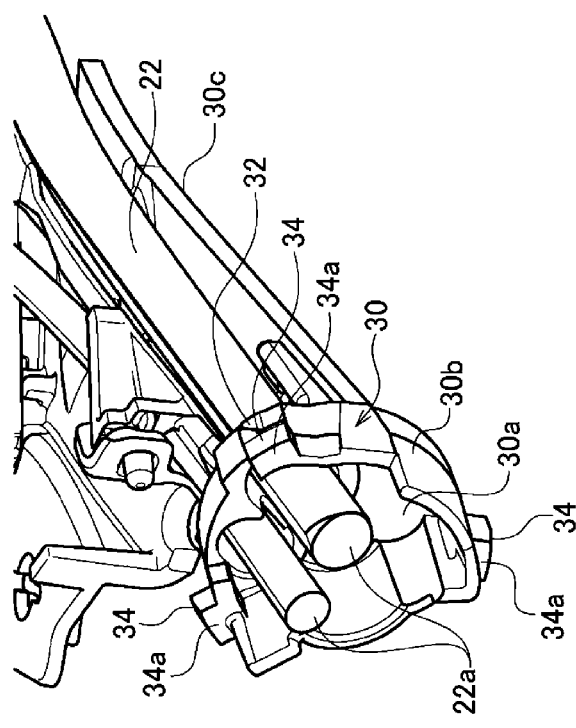

FIGS. 2A and 2B are schematic perspective views illustrating a portion of the second lamp unit 20 according to the embodiment. FIG. 2A illustrates the light guide light entrance portion 22a and the vicinity thereof, and FIG. 2B illustrates the light guide light entrance portion 22a and the vicinity thereof viewed from an angle different from that of FIG. 2A.

The second lamp unit 20 includes a holder 30 that holds the light guide light entrance portion 22a. As will be described later, the holder 30 is configured to be engaged with the positioning member 28. The light guide light entrance portion 22a is supported by the body of the second lamp unit 20 via the holder 30. The holder 30 is bending deformable with respect to the translucent cover 14 (not illustrated in FIGS. 2A and 2B). The holder 30 may be a portion of a bracket or a support member for supporting components of the second lamp unit 20.

The holder 30 includes a first portion 30a that holds the light guide light entrance portion 22a and a second portion 30b that is engaged with the positioning member 28, and a third portion 30c that is bending deformable. Such three portions are integrally formed.

A relative position between the holder 30 and the light guide light entrance portion 22a is fixed by the first portion 30a. For example, the first portion 30a is substantially a disc-shaped plate-shaped portion provided around the light guide light entrance portion 22a, and includes a hole through which the light guide light entrance portion 22a is penetrated. The light guide light entrance portion 22a is inserted into the hole, and the light guide light entrance portion 22a is reliable held by the holder 30. That is, when the holder 30 is moved while being engaged with the positioning member 28, the light guide light entrance portion 22a is displaced and positioned together with the holder 30.

The second portion 30b is formed to at least partially surround the light guide light entrance portion 22a in the circumferential direction. For example, the second portion 30b extends outward (an outward direction of the lamp chamber 16) in the optical axis direction from the first portion 30a along the outer peripheral edge of the first portion 30a.

An outer peripheral surface of the second portion 30b is provided with a characteristic shape for the holder 30 to be engaged with the light emitting element mounting portion 24 and the positioning member 28. That is, the second portion 30b includes an in-plane direction positioning surface 32 and an optical axis direction positioning convex portion 34. The in-plane direction positioning surface 32 is a portion of the outer peripheral surface of the second portion 30b. The optical axis direction positioning convex portion 34 protrudes outward in the radial direction from the outer peripheral surface of the second portion 30b, and includes an upper surface 34a outward in the optical axis direction, and a lower surface 34b inward in the optical axis direction. The in-plane direction positioning surface 32 and the optical axis direction positioning convex portion 34 are disposed to be aligned in the optical axis direction, such that the in-plane direction positioning surface 32 is adjacent to the lower surface 34b of the optical axis direction positioning convex portion 34 in the optical axis direction. The in-plane direction positioning surfaces 32 and the optical axis direction positioning convex portion 34 are formed at a plurality of places at intervals in the circumferential direction. For example, the in-plane direction positioning surfaces 32 and the optical axis direction positioning convex portion 34 are formed at three places substantially at equal intervals in the circumferential direction.

The third portion 30c connects the holder 30 to the body of the second lamp unit 20 such that the holder 30 is able to be displaced with respect to the translucent cover 14. For example, the third portion 30c extends toward a side opposite to the second portion 30b along the light guide 22 from the first portion 30a. By bending the third portion 30c, the holder 30 and the light guide light entrance portion 22a may move to a certain extent (e.g., in a range of ±3 mm in the in-plane direction, and in a range of ±5 mm in the optical axis direction). By rotating the positioning member 28, the light guide light entrance portion 22a is displaced together with the holder 30, whereby the light guide light entrance portion 22a is accurately positioned with respect to the light emitting element 26.

The holder 30 is formed of a resin material. The resin material may be any general-purpose resin, such as, for example, polycarbonate, polypropylene, acrylic, acrylonitrile-styrene-acrylate (ASA), and acrylonitrile-butadiene-styrene (ABS). The holder 30 is manufactured by, for example, injection molding or other suitable molding methods.

Although, for example, two rod-shaped light guides are provided as the light guide 22, the second lamp unit 20 may have one or three or more rod-shaped light guides, or may have a light guide of other shapes.

Figure 3B:
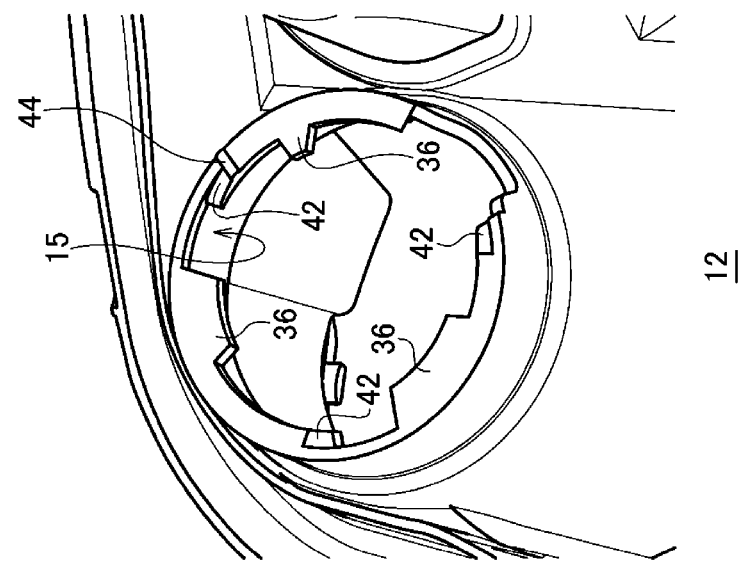
FIGS. 3A and 3B are schematic perspective views illustrating a portion of a lamp body according to an embodiment.
Figure 3A:
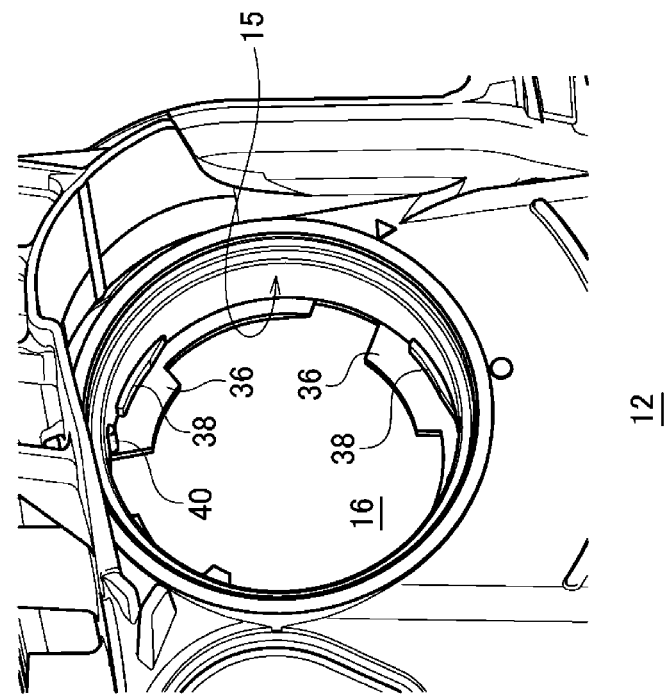

FIGS. 3A and 3B are schematic perspective views illustrating a portion of the lamp body 12 according to the embodiment. FIG. 3A illustrates the light emitting element receiving port 15 viewed from outside the lamp chamber 16, and FIG. 3B illustrates the light emitting element receiving port 15 viewed from inside the lamp chamber 16.

The light emitting element receiving port 15 is a circular opening formed in the lamp body 12. As illustrated in FIG. 3A, on an inner peripheral surface of the light emitting element receiving port 15, an eave-shaped portion 36, an in-plane direction positioning portion 38, and a restriction rib 40 are formed as a shape for engagement with the positioning member 28.

The eave-shaped portion 36 has a shape bent inward in the radial direction from the inner peripheral surface of the light emitting element receiving port 15, and is formed on the edge of the light emitting element receiving port 15 on the lamp chamber 16 (that is, at the deepest position of the light emitting element receiving port 15 viewed from the outside). The in-plane direction positioning portion 38 and the restriction rib 40 are adjacent to the eave-shaped portion 36 on the outer side in the optical axis direction with respect to the eave-shaped portion 36. The radial heights of the in-plane direction positioning portion 38 and the restriction rib 40 from the inner peripheral surface of the light emitting element receiving port 15 are smaller than the radial height of the eave-shaped portion 36. The in-plane direction positioning portion 38 and the restriction rib 40 are closely disposed in the circumferential direction on the inner peripheral surface of the light emitting element receiving port 15. While the restriction rib 40 is a point-shaped projection, the in-plane direction positioning portion 38 linearly extends in the circumferential direction longer than the restriction rib 40. The eave-shaped portion 36, the in-plane direction positioning portion 38, and the restriction rib 40 are formed at a plurality of places at intervals in the circumferential direction (e.g., three places substantially at equal intervals in the circumferential direction).

As illustrated in FIG. 3B, the light emitting element receiving port 15 includes a first guide surface 42 and a first lock 44 so as to lock the positioning member 28 when the light emitting element mounting portion 24 is mounted on the lamp body 12.

The first guide surface 42 is formed at a circumferential end on the back surface of the eave-shaped portion 36. The first guide surface 42 is formed at a plurality of places at intervals in the circumferential direction (e.g., three places substantially at equal intervals in the circumferential direction). The first lock 44 is adjacent in the circumferential direction to the first guide surface 42 on the back surface of the eave-shaped portion 36. In the illustrated example, although the first lock 44 is formed only at one eave-shaped portion 36, but it may be added to other eave-shaped portions 36.

Figure 5A:
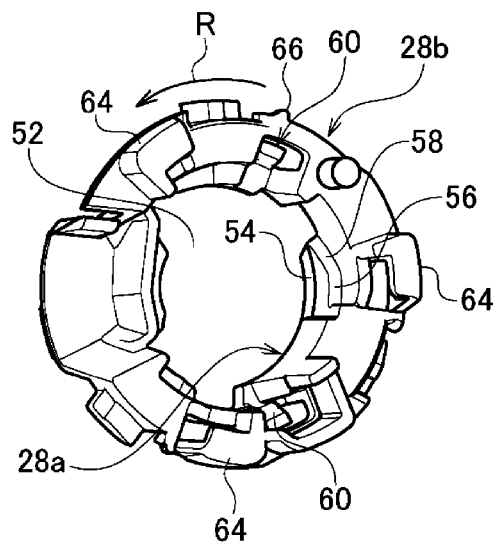
FIGS. 5A to 5D are schematic perspective views illustrating a positioning member according to an embodiment.
Figure 5B:
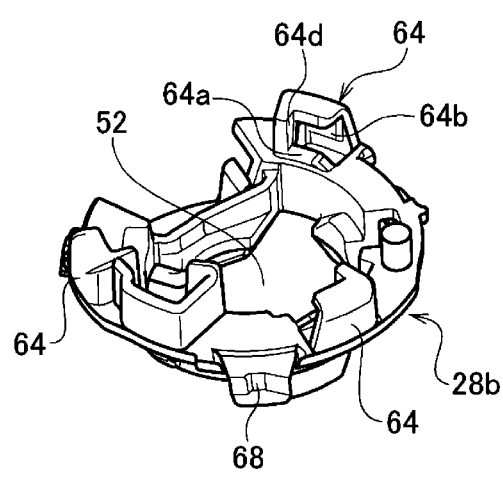
Figure 5C:
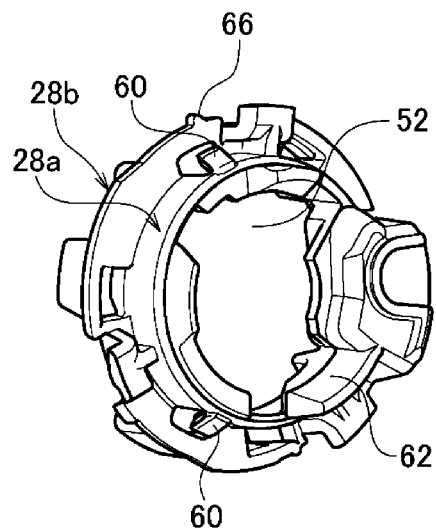
Figure 5D:
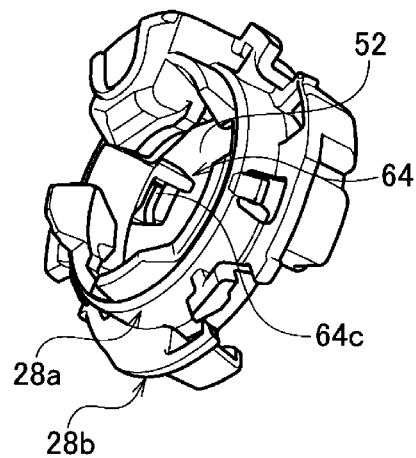

The first guide surface 42 is provided to guide a portion (e.g., a second lock 68 of the positioning member 28 illustrated in FIG. 5B), which is locked by the first lock 44 when the light emitting element mounting portion 24 and the positioning member 28 are rotated with respect to the light emitting element receiving port 15, to the first lock 44. By guiding the light emitting element mounting portion 24 and the positioning member 28 by the first guide surface 42, and going over the first lock 44, the first lock 44 and the second lock 68 are engaged, and the light emitting element mounting portion 24 and the positioning member 28 are locked to be fixed to the lamp body 12.

Figure 4B:
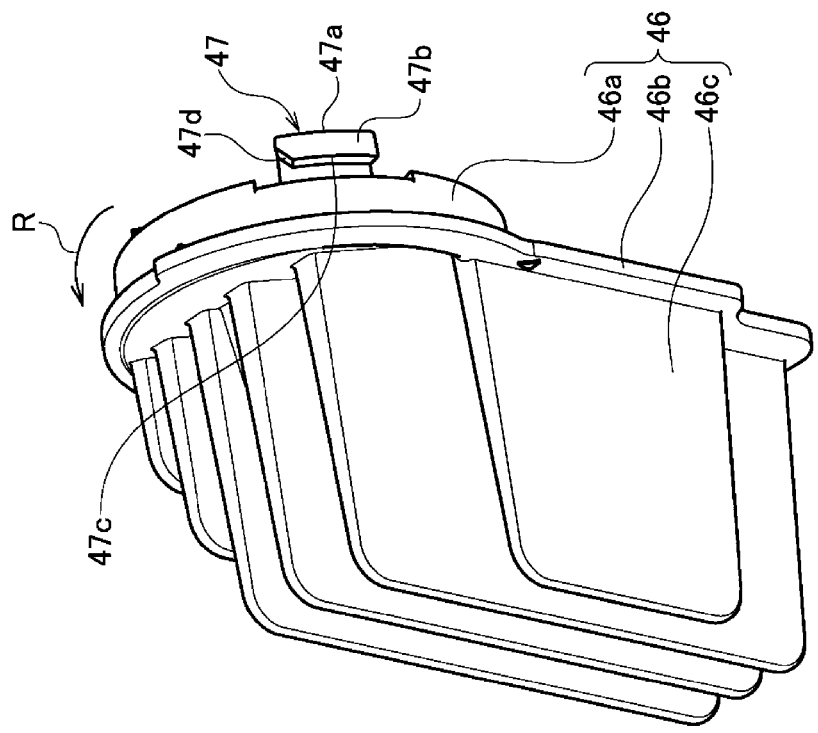
FIGS. 4A and 4B are schematic perspective views illustrating a light emitting element mounting portion according to an embodiment.
Figure 4A:
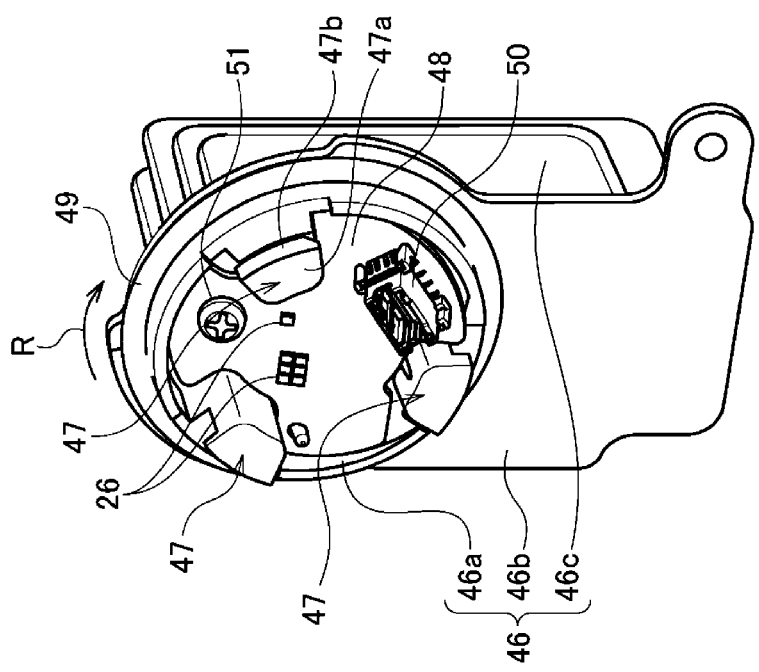

FIGS. 4A and 4B are schematic perspective views illustrating the light emitting element mounting portion 24 according to the embodiment. FIG. 4A illustrates the light emitting element mounting portion 24 viewed from the light emitting element 26, and FIG. 4B illustrates the light emitting element mounting portion 24 viewed from the opposite side. In a state where the light emitting element mounting portion 24 is mounted on the lamp body 12, FIG. 4A is inside and FIG. 4B is outside.

The light emitting element mounting portion 24 includes a support member 46 and a substrate 48 that supports the light emitting element 26 and provides an electrical connection to the light emitting element 26. The support member 46 not only supports the substrate 48, but also functions as a heat dissipating member that dissipates the heat generated by the light emitting element 26, and is also referred to as a "heat sink." The support member 46 is made of, for example, a metal material having high thermal conductivity such as aluminum or an aluminum alloy, and is manufactured by, for example, a die casting method.

The support member 46 includes a substrate support surface 46a, a flat portion 46b, and a heat dissipation portion 46c. The substrate support surface 46a includes a flat surface that supports the substrate 48. The substrate support surface 46a is formed in a circle having a radius substantially equal to that of the light emitting element receiving port 15, and the light emitting element receiving port 15 may receive the substrate support surface 46a. An O-ring 49 is attached around the substrate support surface 46a for sealing when the light emitting element mounting portion 24 is mounted on the light emitting element receiving port 15. The flat portion 46b is a plate-shaped portion adjacent to the substrate support surface 46a. The heat dissipation portion 46c is formed as a plurality of heat dissipating fins provided upright on the substrate support surface 46a and the flat portion 46b, on the side opposite to the light emitting element 26 and the substrate 48.

Therefore, the support member 46 has an elongated shape in a radial direction of the substrate support surface 46a. In other words, the length of the heat dissipation portion 46c is longer than the diameter of the substrate support surface 46a. By elongating the support member 46 in this way, an operation in which the light emitting element mounting portion 24 is mounted on the lamp body 12 becomes easy. The heat dissipation portion 46c may be used as a handle that facilitates the rotation of the light emitting element mounting portion 24 with respect to the lamp body 12 when the light emitting element mounting portion 24 is mounted on the lamp body 12. An operator grasps the heat dissipation portion 46c not on the substrate support surface 46a but on the flat portion 46b to set the substrate support surface 46a in the light emitting element receiving port 15. As compared with a case where the light emitting element mounting portion 24 does not have an elongated shape and is formed only by a circular portion the same as the substrate support surface 46a, the operator may rotate the light emitting element mounting portion 24 with a small force, by using the principle of leverage by grasping the heat dissipation portion 46c on the flat portion 46b.

The support member 46 also includes a positioning hook 47. The positioning hook 47 is provided upright on the outer peripheral portion of the substrate support surface 46a on the same side as the light emitting element 26 and the substrate 48. The positioning hook 47 is formed at a plurality of places at intervals in the circumferential direction (e.g., three places substantially at equal intervals in the circumferential direction).

The positioning hook 47 includes a first positioning surface 47a which is an end surface of the positioning hook 47, a second positioning surface 47b which is an outer surface of the positioning hook 47, and a third positioning surface 47c which faces away from the first positioning surface 47a. The first positioning surface 47a and the third positioning surface 47c are involved in positioning in the optical axis direction, and the second positioning surface 47b is involved in positioning in the in-plane direction.

The first positioning surface 47a is flat and has substantially a trapezoidal shape. The second positioning surface 47b connects the first positioning surface 47a to the third positioning surface 47c, and is curved in a cylindrical shape about the rotation center of the light emitting element mounting portion 24. The third positioning surface 47c has the same length in the circumferential direction as the first positioning surface 47a, but the radial width thereof is smaller than that of the first positioning surface 47a.

In addition, a second guide surface 47d is formed on a front end side of the third positioning surface 47c in the rotational direction R when the light emitting element mounting portion 24 is mounted on the light emitting element receiving port 15. The second guide surface 47d is an inclined surface or a chamfered surface which is inclined toward the first positioning surface 47a from the third positioning surface 47c. The second guide surface 47d is provided to guide the second lock 68 of the positioning member 28 at the second guide surface 47d and the first guide surface 42 of the light emitting element receiving port 15 to the first lock 44, when the light emitting element mounting portion 24 and the positioning member 28 are rotated.

The light emitting element 26 is, for example, a semiconductor light emitting element such as a light emitting diode (LED), and in the illustrated example, six light emitting elements 26 for the first light guide 22 are disposed in two rows and three columns on the substrate 48, and one light emitting element 26 for the second light guide 22 is disposed on the substrate 48 separated from the six light emitting elements 26.

The shape of the substrate 48 is determined so as to be accommodated on the substrate support surface 46a while avoiding interference with the positioning hook 47. A connector 50 for supplying power to the light emitting element 26 is provided on the substrate 48. A wire harness extended from the inside of the lamp chamber 16 may be connected to the connector 50, whereby power may be supplied to the light emitting element 26. When the light emitting element mounting portion 24 is mounted on the light emitting element receiving port 15, the connector 50 is disposed in the lamp chamber 16. The substrate 48 is fixed to the substrate support surface 46a by a screw 51.

FIGS. 5A to 5D are schematic perspective views illustrating the positioning member 28 according to the embodiment. FIGS. 5A to 5D respectively illustrate the positioning member 28 viewed from different angles. FIGS. 5A and 5B mainly illustrate a surface that faces outward and FIGS. 5C and 5D mainly illustrate a surface that faces inward, when disposed in the light emitting element receiving port 15.

The positioning member 28 has various shapes configured to engage with the light emitting element receiving port 15, the light emitting element mounting portion 24, and the holder 30 at here and there, but as a whole, has an annular shape having an opening 52 at its center. The positioning member 28 is configured to receive the holder 30 and the light guide light entrance portion 22a in the opening 52 at the center to be engaged with the holder 30 at the inner peripheral side of the annular shape and to be engaged with the light emitting element receiving port 15 and the light emitting element mounting portion 24 at the outer peripheral side of the annular shape.

The positioning member 28 includes a first ring 28a and a second ring 28b disposed substantially concentrically so as to surround the opening 52 at the center, and such two rings are integrally formed. The second ring 28b is positioned outer side with respect to the first ring 28a when the positioning member 28 is disposed in the light emitting element receiving port 15. In addition, the second ring 28b has a larger outer diameter than that of the first ring 28a.

The first ring 28a has an in-plane direction positioning surface 54, an optical axis direction positioning surface 56, and an inclined surface 58. The in-plane direction positioning surface 54 abuts on the in-plane direction positioning surface 32 of the holder 30 so as to position the light guide light entrance portion 22a in the in-plane direction with respect to the positioning member 28. The optical axis direction positioning surface 56 abuts on the lower surface 34b of the optical axis direction positioning convex portion 34 of the holder 30 so as to position the light guide light entrance portion 22a in the optical axis direction with respect to the positioning member 28.

Therefore, the in-plane direction positioning surface 54 and the optical axis direction positioning surface 56 are disposed on the places, on the first ring 28a, corresponding to the in-plane direction positioning surface 32 and the optical axis direction positioning convex portion 34 of the holder 30. The optical axis direction positioning surface 56 is adjacent to the outside in the optical axis direction with respect to the in-plane direction positioning surface 54. In addition, the optical axis direction positioning surface 56 is adjacent to the rear side in the rotational direction R with respect to the inclined surface 58. The inclined surface 58 is inclined so as to guide the optical axis direction positioning convex portion 34 of the holder 30 to the optical axis direction positioning surface 56 of the positioning member 28 when the positioning member 28 is rotated in the rotational direction R together with the light emitting element mounting portion 24. The in-plane direction positioning surface 54, the optical axis direction positioning surface 56, and the inclined surface 58 are formed at a plurality of places at intervals in the circumferential direction (e.g., three places substantially at equal intervals in the circumferential direction) on the first ring 28a.

In addition, the first ring 28a includes two hooks 60, and a holder guide slope 62. A hook 60 is provided to temporarily hold the positioning member 28 in the optical axis direction by sandwiching the eave-shaped portion 36 of the light emitting element receiving port 15 between the hook 60 and the second ring 28b. The holder guide slope 62 is provided to facilitate reception of the holder 30 into the opening 52 at the center when the positioning member 28 is temporarily held in the light emitting element receiving port 15.

The second ring 28b includes an engagement projection 64 engaged with the positioning hook 47 of the light emitting element mounting portion 24. The engagement projection 64 extends outward in the optical axis direction from a position on the second ring 28b corresponding to the positioning hook 47 of the light emitting element mounting portion 24. The engagement projection 64 is formed at a plurality of places at intervals in the circumferential direction (e.g., three places substantially at equal intervals in the circumferential direction) on the second ring 28b.

The engagement projection 64 includes a first engagement surface 64a, a second engagement surface 64b, and a third engagement surface 64c. The first engagement surface 64a, the second engagement surface 65b, and the third engagement surface 64c are engaged with the first positioning surface 47a, the second positioning surface 47b, and the third positioning surface 47c of the positioning hook 47, respectively. The first positioning surface 47a and the third positioning surface 47c are involved in positioning in the optical axis direction, and the second positioning surface 47b is involved in positioning in the in-plane direction.

Additionally, the engagement projection 64 includes a positioning hook abutment surface 64d provided to rotate the positioning member 28 together with the light emitting element mounting portion 24. When the light emitting element mounting portion 24 rotates with respect to the positioning member 28, and the positioning hook 47 is engaged with the engagement projection 64, a side surface of the positioning hook 47 abuts on the positioning hook abutment surface 64d.

In addition, the second ring 28b includes a temporary holder 66 engaged with the restriction rib 40 of the light emitting element receiving port 15. The temporary holder 66 is a small projection that protrudes outward in the radial direction from the second ring 28b, and is formed at a plurality of places at intervals in the circumferential direction (e.g., three places substantially at equal intervals in the circumferential direction) on the second ring 28b, corresponding to the restriction rib 40. The second ring 28b includes a second lock 68 engaged with the first lock 44.

The positioning member 28 is formed of a resin material. The resin material may be any general-purpose resin, such as, for example, polycarbonate, polypropylene, acrylic, acrylonitrile-styrene-acrylate (ASA), and acrylonitrile-butadiene-styrene (ABS). The positioning member 28 is manufactured by, for example, injection molding or other suitable molding methods.

Figure 6:
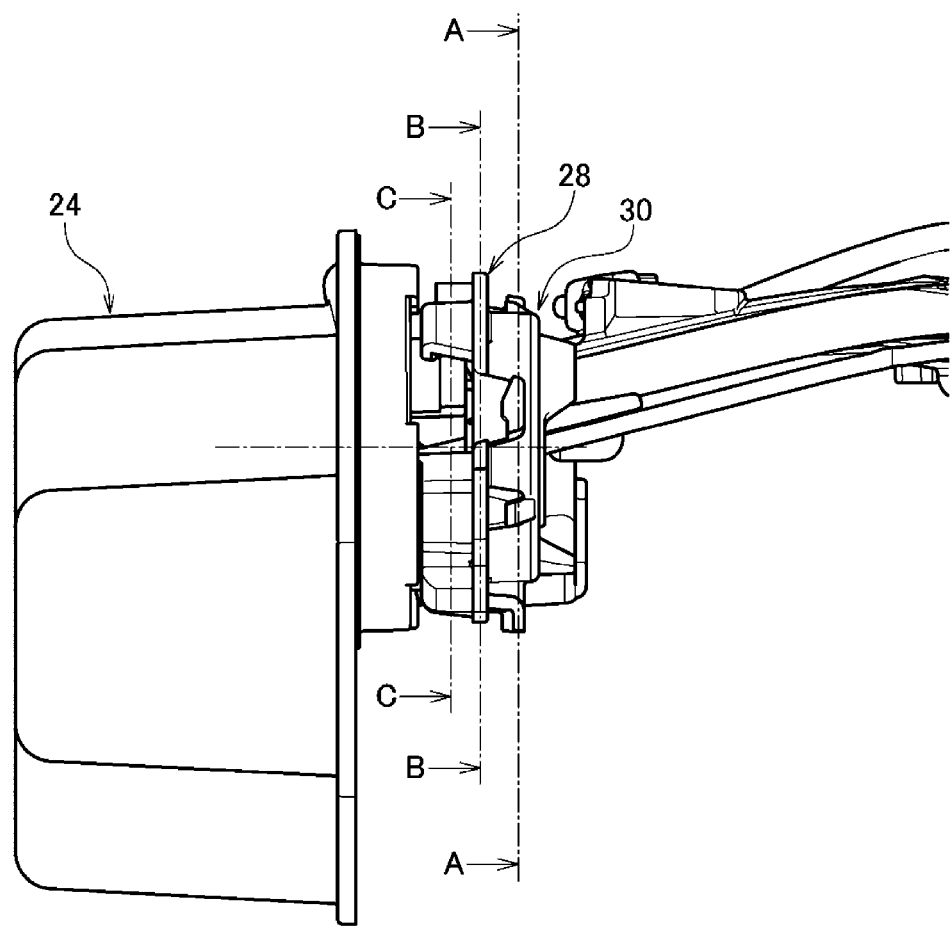
FIG. 6 is a schematic side view illustrating a portion of a vehicle lamp according to an embodiment.

FIG. 6 is a schematic side view illustrating a portion of the vehicle lamp 10 according to the embodiment. FIG. 6 illustrates the light emitting element mounting portion 24, the positioning member 28, and the holder 30 in a state where the light emitting element mounting portion 24 is mounted on the lamp body 12. For ease of understanding, the illustration of the lamp body 12 and the translucent cover 14 is omitted.

FIGS. 7 to 11 are schematic rear views illustrating respective steps in a method of manufacturing the vehicle lamp 10 according to the embodiment. In the respective drawings, the light emitting element receiving port 15 and the vicinity thereof are illustrated. In the following, as necessary, while referring to the cross-sections in the respective steps, which are taken along line A-A, line B-B, and line C-C illustrated in FIG. 6, the engagement of the light emitting element receiving port 15, the light emitting element mounting portion 24, the positioning member 28, and the holder 30 will be further described.

First, the lamp body 12, the translucent cover 14, the light emitting element mounting portion 24, and the positioning member 28 are prepared. The second lamp unit 20 is attached to the translucent cover 14 in advance, and the light guide light entrance portion 22a is supported by the translucent cover 14 via the holder 30.

Figure 7:
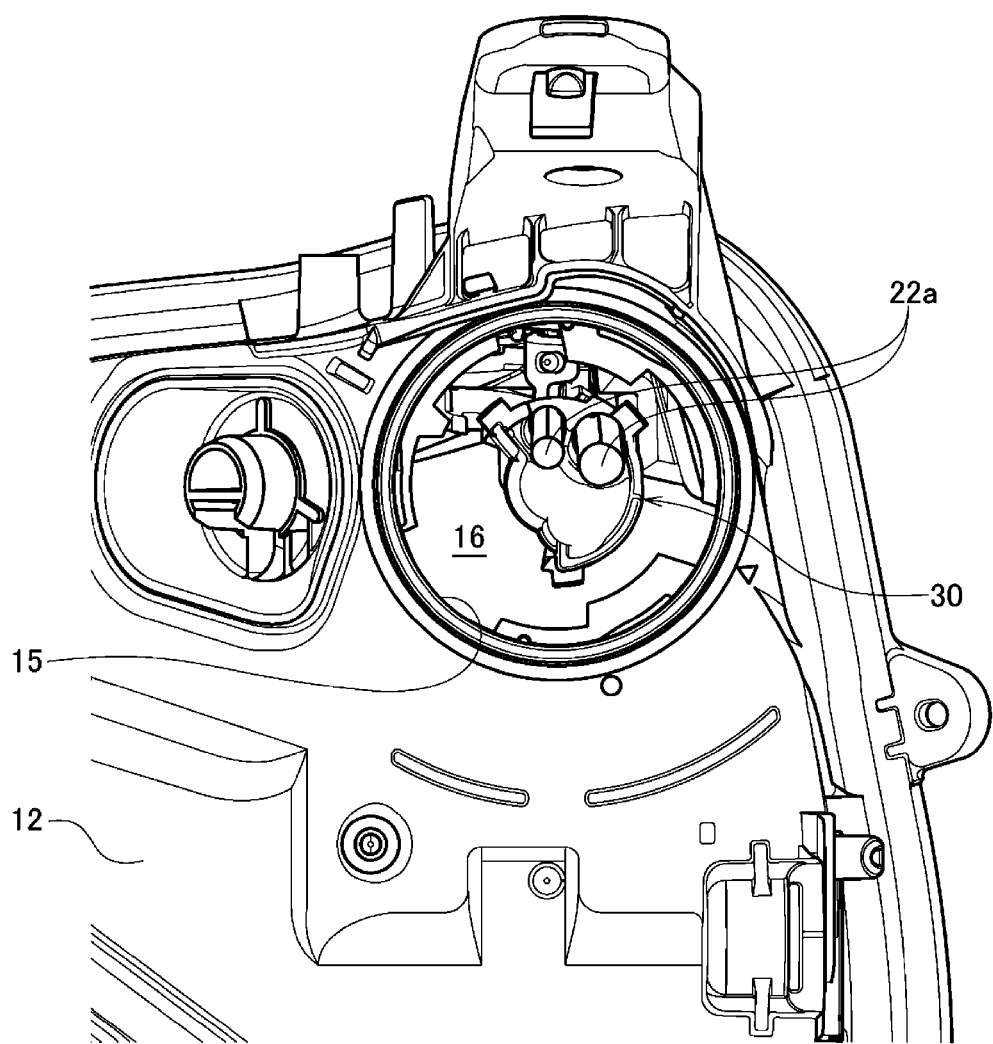
FIG. 7 is a schematic rear view illustrating respective steps in a method of manufacturing a vehicle lamp according to an embodiment.

FIG. 7 illustrates a state before the light emitting element mounting portion 24 and the positioning member 28 are set in the light emitting element receiving port 15. When the translucent cover 14 is attached to the lamp body 12, and the lamp chamber 16 is formed between the lamp body 12 and the translucent cover 14, the light guide light entrance portion 22a is disposed in the vicinity of the light emitting element receiving port 15. The light guide light entrance portion 22a is positioned near the center of the light emitting element receiving port 15 together with the holder 30. The light guide light entrance portion 22a and the holder 30 are not in direct contact with the lamp body 12.

Figure 12A:
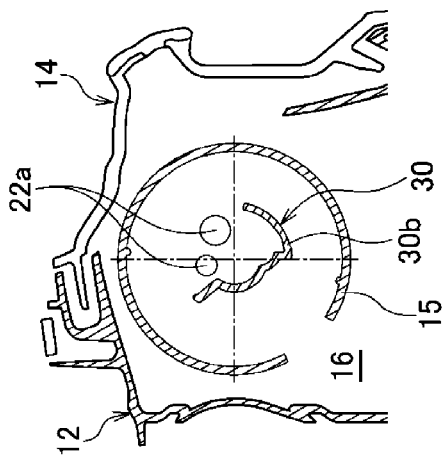
FIGS. 12A to 12C are schematic cross-sectional views illustrating the step illustrated in FIG. 7 in more detail.
Figure 12B:
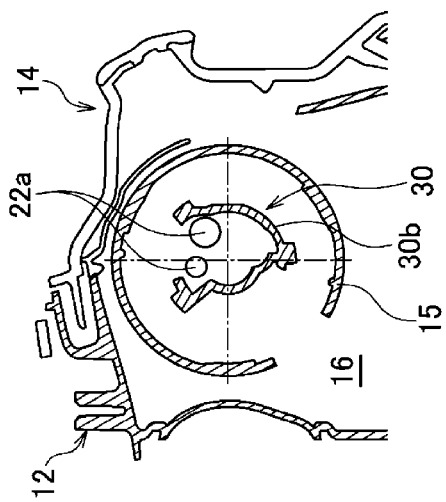
Figure 12C:
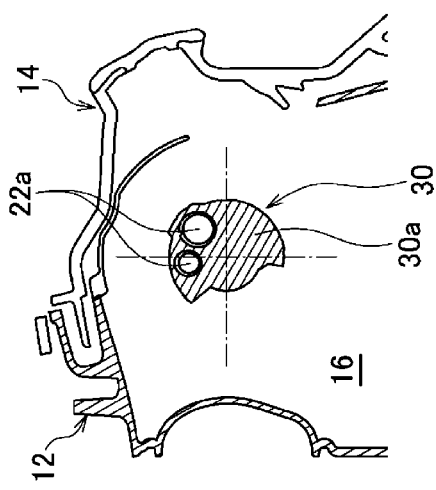

FIGS. 12A to 12C illustrate a cross-section taken along line A-A, a cross-section taken along line B-B, and a cross-section taken along line C-C in the state before setting the positioning member 28 in FIG. 7, respectively. FIG. 12A illustrates the first portion 30a of the holder 30, and FIGS. 12B and 12C illustrate the second portion 30b of the holder 30.

Figure 8:
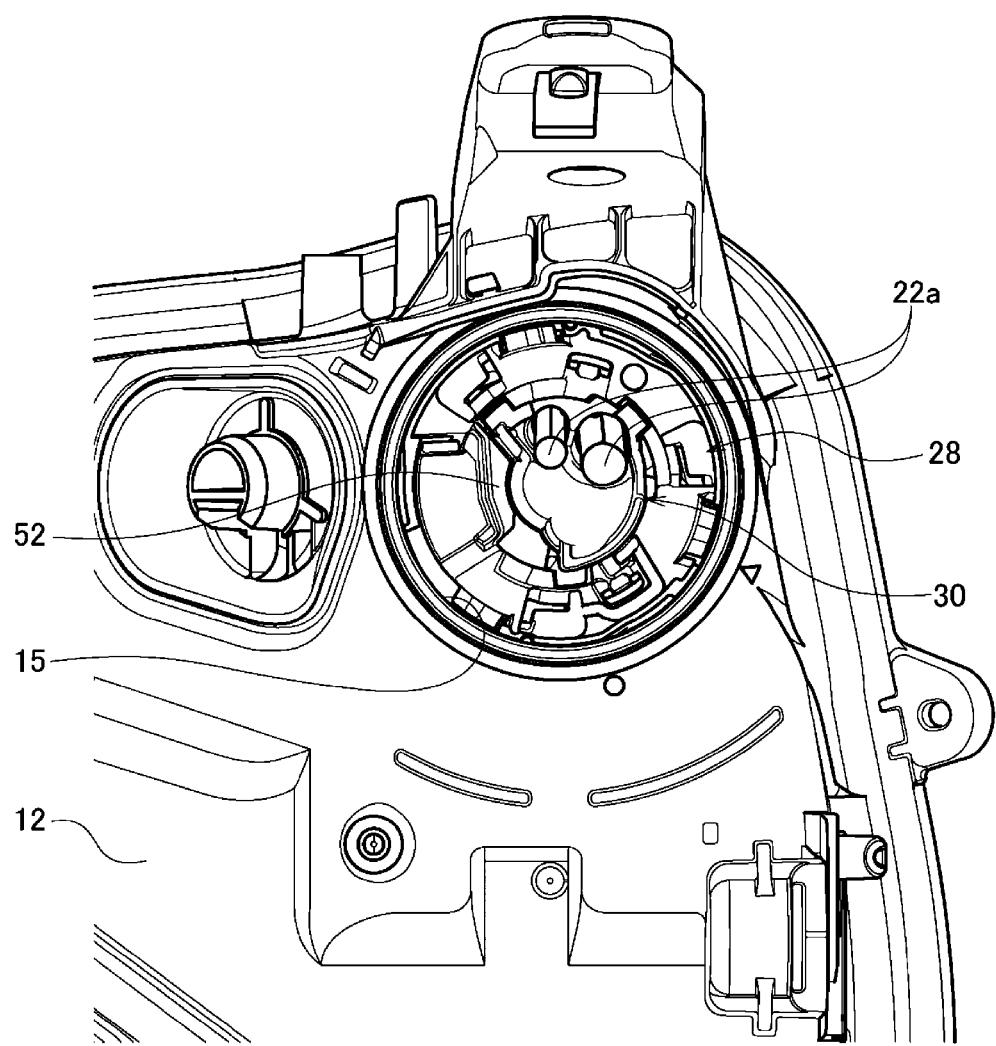
FIG. 8 is a schematic rear view illustrating respective steps in a method of manufacturing a vehicle lamp according to an embodiment.

Next, as illustrated in FIG. 8, the positioning member 28 is disposed in the light emitting element receiving port 15. When the positioning member 28 is set in the light emitting element receiving port 15, the positioning member 28 is temporarily held by the light emitting element receiving port 15, and the light guide light entrance portion 22a and the holder 30 are accommodated in the opening 52 at the center.

Figure 13B:
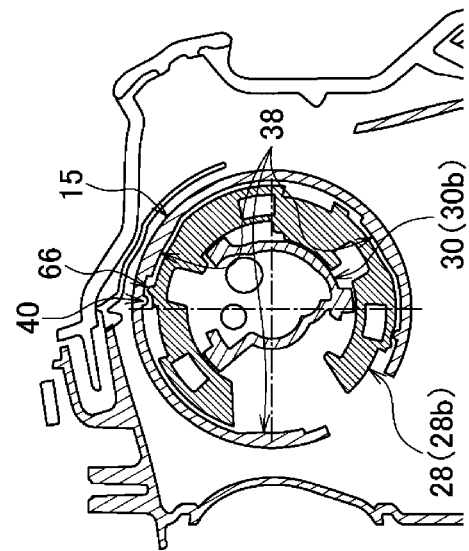
FIGS. 13A to 13D are schematic cross-sectional views illustrating the step illustrated in FIG. 8 in more detail.
Figure 13D:
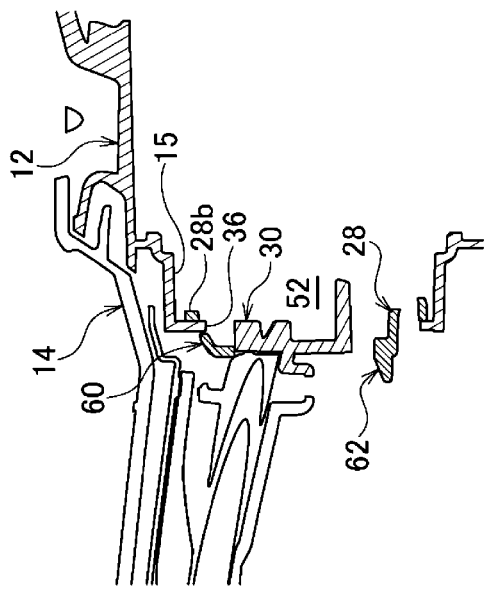
Figure 13A:
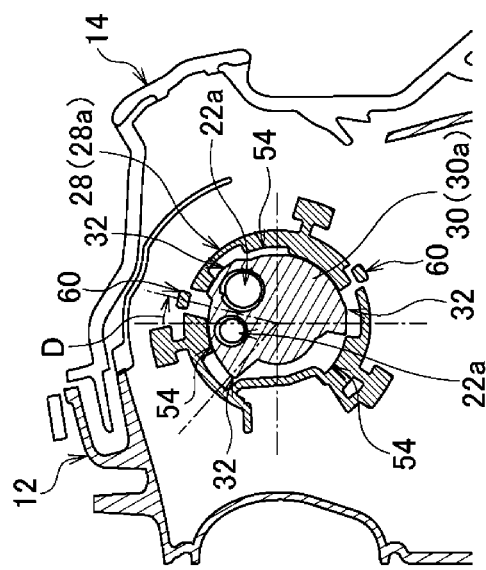
Figure 13C:
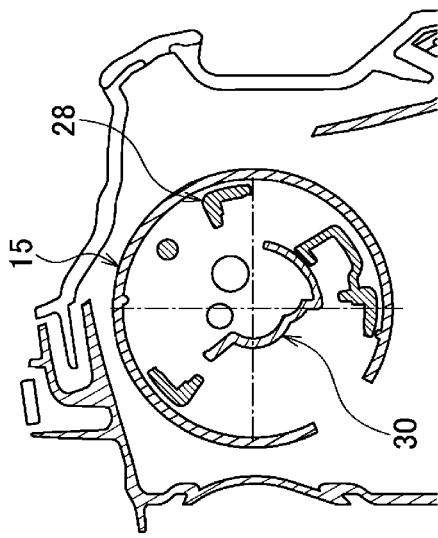

FIGS. 13A to 13C illustrate a cross-section taken along line A-A line, a cross-section taken along line B-B, and a cross-section taken along line C-C in a state after setting the positioning member 28 illustrated in FIG. 8, respectively. FIG. 13D illustrates a cross-section taken along line D-D in FIG. 13A.

FIG. 13A illustrates the first portion 30a of the holder 30 and the first ring 28a of the positioning member 28. As understood from FIGS. 13A and 13D, the positioning member 28 is held in the optical axis direction with respect to the light emitting element receiving port 15 by lance engagement. That is, the eave-shaped portion 36 of the light emitting element receiving port 15 is sandwiched between the hook 60 of the positioning member 28 and the second ring 28b, whereby the movement of the positioning member 28 in the optical axis direction is restricted. In addition, since the in-plane direction positioning surface 32 of the holder 30 and the in-plane direction positioning surface 54 of the positioning member 28 are shifted in the circumferential direction, they are not in contact with each other.

As illustrated in FIG. 13B, the temporary holder 66 of the positioning member 28 is positioned between the in-plane direction positioning portion 38 of the light emitting element receiving port 15 and the restriction rib 40. In this way, the movement of the positioning member 28 is the circumferential direction (rotational direction around the optical axis) is restricted by the temporary holder 66 being sandwiched between the in-plane direction positioning portion 38 and the restriction rib 40.

As illustrated in FIGS. 13A to 13C, the first portion 30a of the holder 30 is surrounded in contact with the first ring 28a of the positioning member 28, and the second portion 30b of the holder 30 is surrounded in contact with the second ring 28b of the positioning member 28. There is some play between the light emitting element receiving port 15, the positioning member 28, and the holder 30, and the movement of the positioning member 28 in that range is allowed.

When the positioning member 28 is set in the light emitting element receiving port 15, the holder guide slope 62 of the positioning member 28 serves to guide the holder 30 into the opening 52 of the positioning member 28. At this time, the positioning member 28 is in the lance engagement with the light emitting element receiving port 15, and the holder 30 is guided to a certain initial position by the positioning member 28. The initial position is different from the position where the holder 30 is supposed to be finally positioned (that is, the position where the light guide light entrance portion 22a is supposed to be positioned with respect to the light emitting element 26 when the light emitting element mounting portion 24 is mounted).

Although not illustrated, the wire harness extends from the lamp chamber 16 to the light emitting element receiving port 15. After the positioning member 28 is set in the light emitting element receiving port 15, a connector of the wire harness is coupled to the connector 50 of the light emitting element mounting portion 24. The electrical connection to the light emitting element mounting portion 24 is made from the inside of the lamp chamber 16.

Subsequently, with reference to FIG. 9 to FIG. 17C, a mounting step of the light emitting element mounting portion 24 will be described. The light emitting element mounting portion 24 is mounted on the lamp body 12 so as to close the light emitting element receiving port 15, and to dispose the light emitting element 26 to face the light guide light entrance portion 22a. This mounting step is performed such that the light guide light entrance portion 22a and the light emitting element 26 are positioned with respect to each other by the positioning member 28. The mounting step includes a step of rotating the light emitting element mounting portion 24 with respect to the light emitting element receiving port 15 and the positioning member 28 such that the light emitting element mounting portion 24 is engaged with the positioning member 28, and a step of further rotating the light emitting element mounting portion 24 together with the positioning member 28 with respect to the light emitting element receiving port 15 such that the light guide light entrance portion 22a and the light emitting element 26 are positioned with respect to each other by the positioning member 28.

Figure 9:
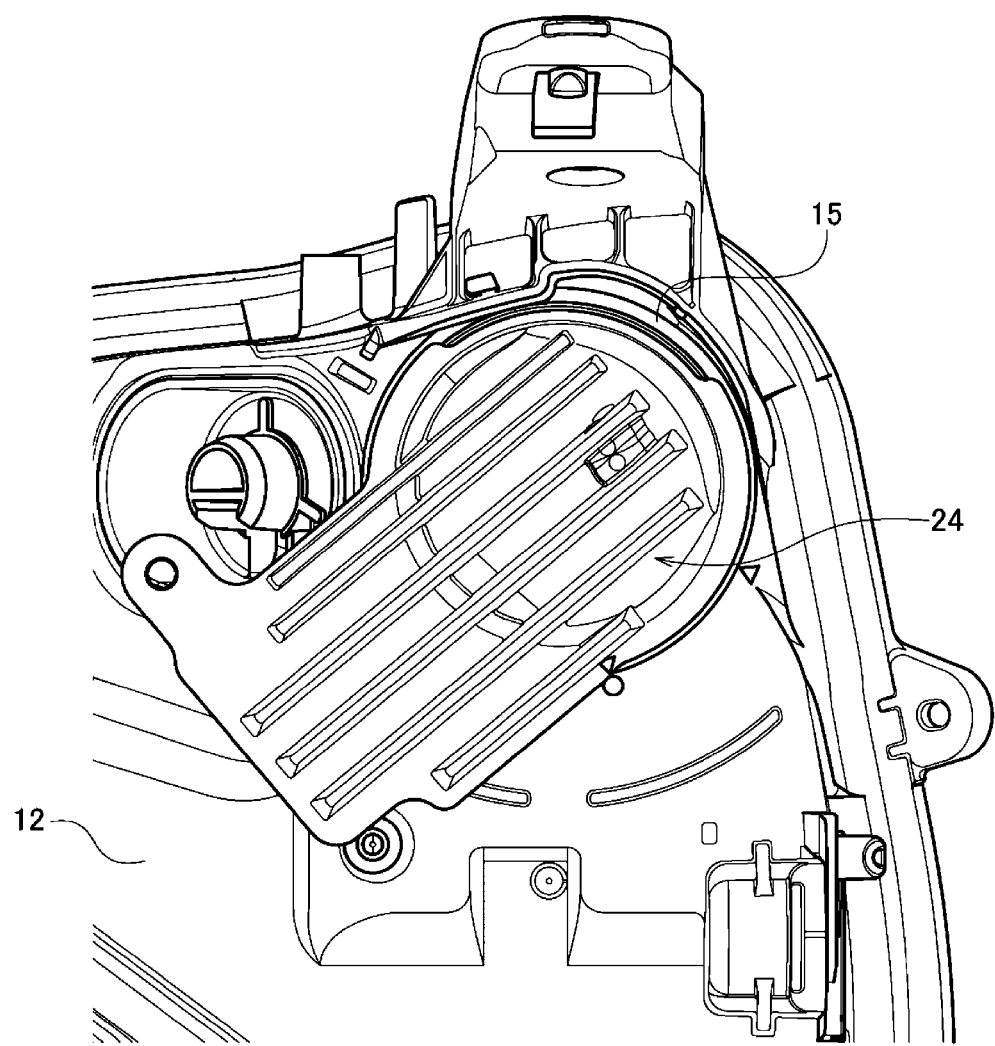
FIG. 9 is a schematic rear view illustrating respective steps in a method of manufacturing a vehicle lamp according to an embodiment.
Figure 14:
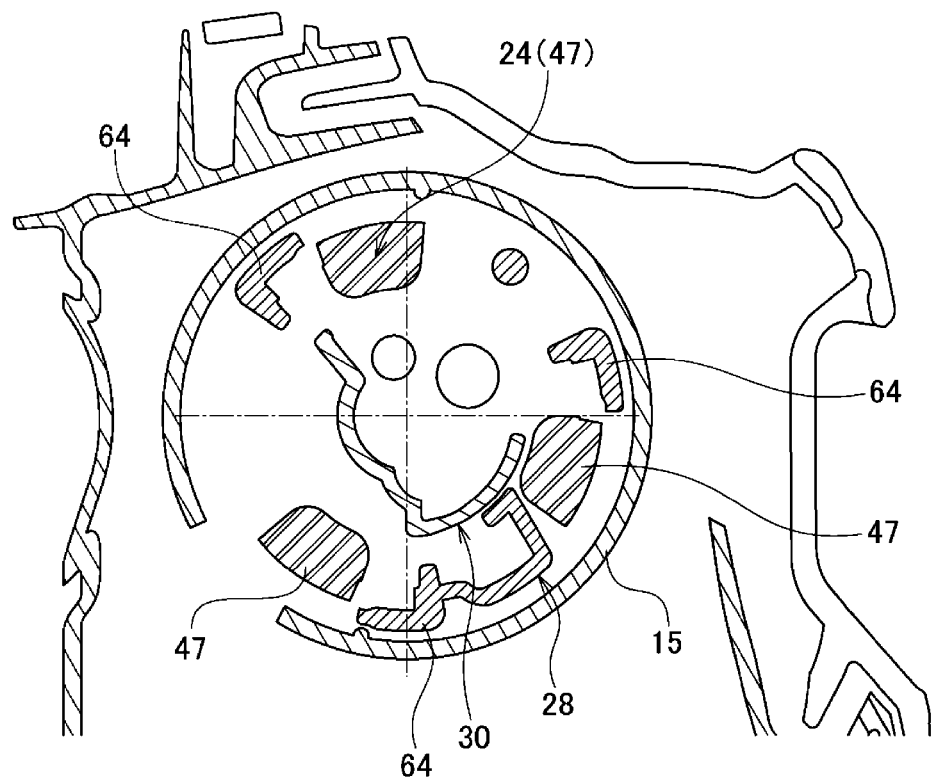
FIG. 14 is a schematic cross-sectional view illustrating the step illustrated in FIG. 9 in more detail.

As illustrated in FIG. 9, the light emitting element mounting portion 24 is set in the light emitting element receiving port 15 at a predetermined set angle. FIG. 14 illustrates the cross-section taken along line C-C in the state after setting the light emitting element mounting portion 24 illustrated in FIG. 9. The positioning hook 47 of the light emitting element mounting portion 24 is disposed around the holder 30. However, the positioning hook 47 is separated in the circumferential direction from the engagement projection 64 of the positioning member 28, and is not engaged therewith. Therefore, there is still play between the light emitting element receiving port 15, the positioning member 28, and the holder 30.

Figure 10:
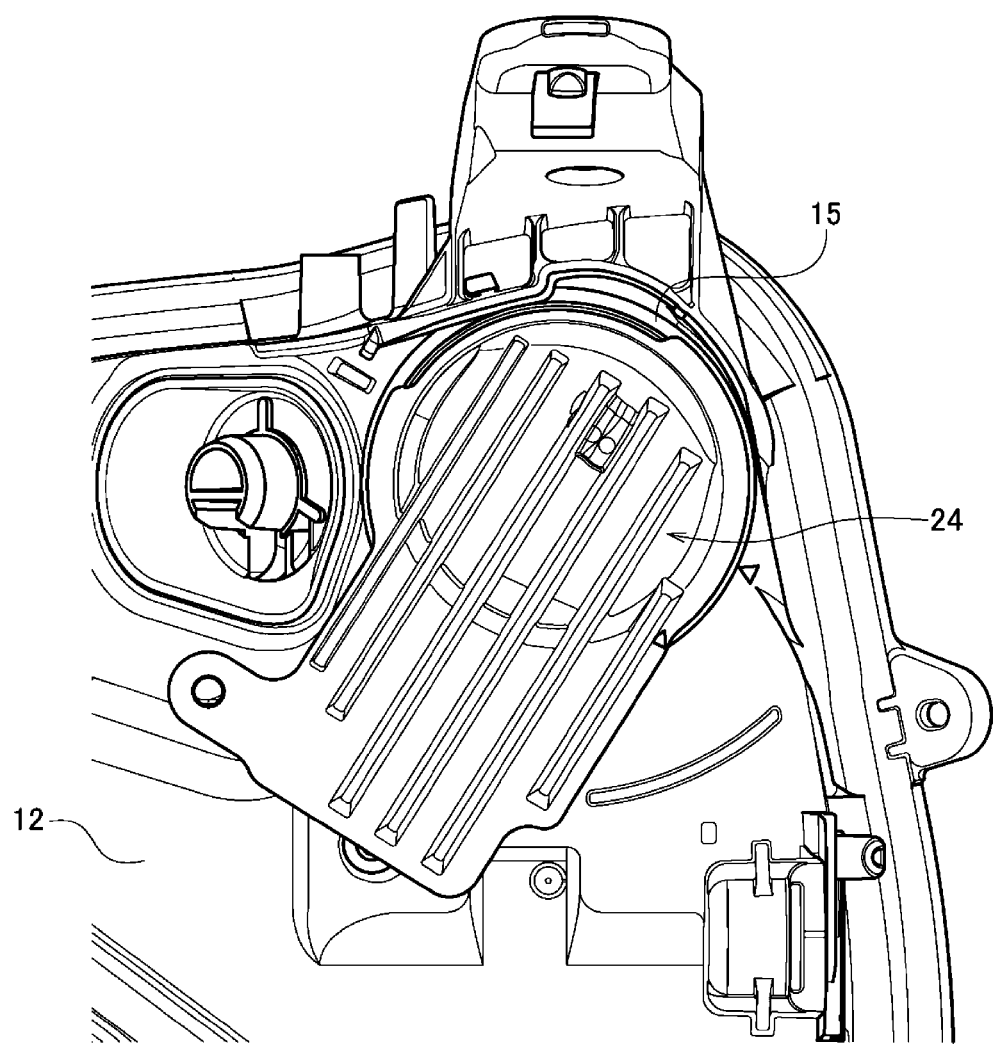
FIG. 10 is a schematic rear view illustrating respective steps in a method of manufacturing a vehicle lamp according to an embodiment.
Figure 15B:
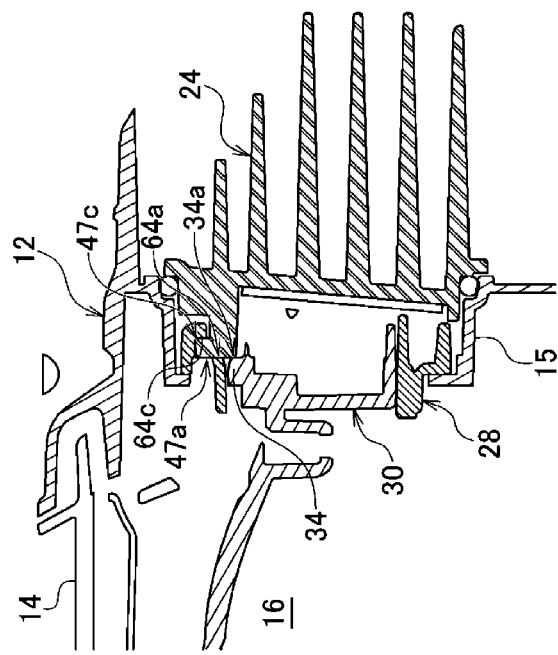
FIGS. 15A and 15B are schematic cross-sectional views illustrating the step illustrated in FIG. 10 in more detail.
Figure 15A:
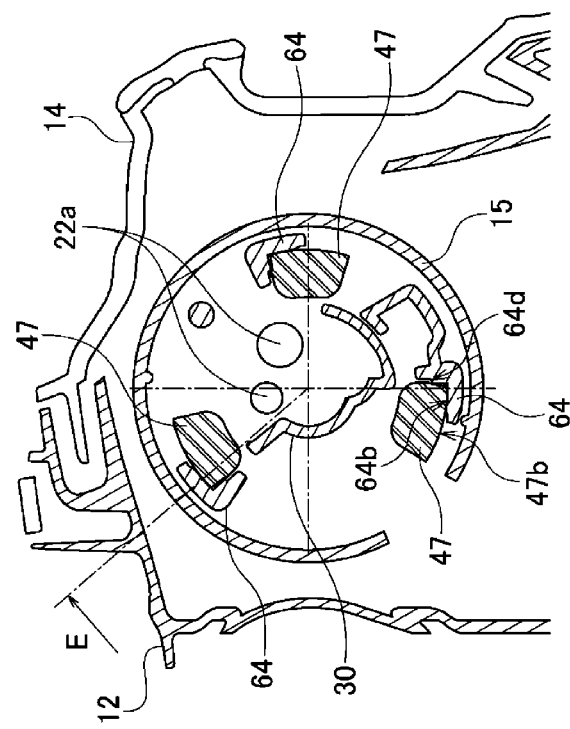

As illustrated in FIG. 10, the light emitting element mounting portion 24 is rotated by a first angle with respect to the light emitting element receiving port 15. The light emitting element mounting portion 24 is rotated, for example, counterclockwise by 18 degrees from the set angle. FIG. 15A illustrates the cross-section taken along line C-C in the state illustrated in FIG. 10. FIG. 15B illustrates a cross-section taken along line E-E in FIG. 15A.

While the light emitting element mounting portion 24 is rotated by the first angle, only the light emitting element mounting portion 24 is rotated, and the positioning member 28 is temporarily held by the lamp body 12 as described above. At this time, the positioning member 28 is not rotated together with the light emitting element mounting portion 24.

When the light emitting element mounting portion 24 is rotated by the first angle, as understood from FIGS. 15A and 15B, the positioning hook 47 of the light emitting element mounting portion 24 is engaged with the engagement projection 64 of the positioning member 28. The first positioning surface 47a of the positioning hook 47 abuts on the first engagement surface 64a of the engagement projection 64. In addition, the third positioning surface 47c of the positioning hook 47 abuts on the third engagement surface 64c of the engagement projection 64. In this way, the positioning member 28 and the light emitting element mounting portion 24 are positioned with respect to each other in the optical axis direction by engaging the positioning hook 47 and the engagement projection 64 with each other.

At the same time, the first positioning surface 47a of the positioning hook 47 also abuts on the upper surface 34a of the optical axis direction positioning convex portion 34 of the holder 30. The first engagement surface 64a of the engagement projection 64 and the upper surface 34a of the optical axis direction positioning convex portion 34 of the holder 30 are positioned on the same plane. Therefore, the holder 30 is pushed toward the lamp chamber 16 by the positioning hook 47 of the light emitting element mounting portion 24. In this way, the displacement of the holder 30 and the light guide light entrance portion 22a outward in the optical axis direction is restricted.

In addition, as illustrated in FIG. 15A, the second positioning surface 47b of the positioning hook 47 abuts on the second engagement surface 64b of the engagement projection 64. As a result, the light emitting element mounting portion 24 is positioned in the in-plane direction with respect to the positioning member 28. As a result of the rotation of the light emitting element mounting portion 24 by the first angle, the side surface of the positioning hook 47 abuts on the positioning hook abutment surface 64d of the engagement projection 64.

Figure 11:
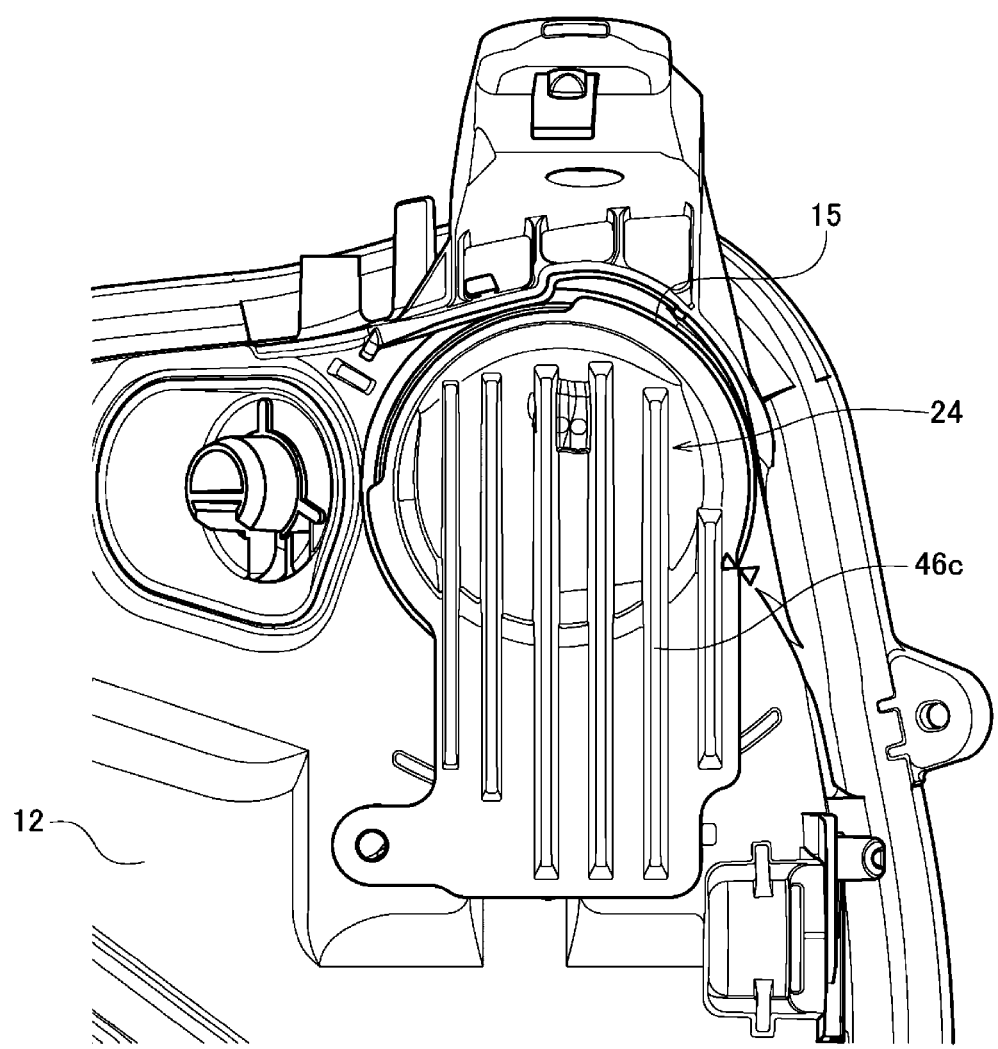
FIG. 11 is a schematic rear view illustrating respective steps in a method of manufacturing a vehicle lamp according to an embodiment.

Subsequently, as illustrated in FIG. 11, the light emitting element mounting portion 24 is rotated by a second angle with respect to the light emitting element receiving port 15. The light emitting element mounting portion 24 is rotated, for example, counterclockwise by 32 degrees from the state in FIG. 10 (that is, rotated by 50 degrees from the set angle in FIG. 9). As a result of the rotation by the second angle, the heat dissipating fin of the heat dissipation portion 46c of the light emitting element mounting portion 24 becomes parallel to the vertical direction.

At this time, the positioning member 28 is rotated by the second angle together with the light emitting element mounting portion 24 by the engagement of the light emitting element mounting portion 24 and the positioning member 28. Since the side surface of the positioning hook 47 abuts on the positioning hook abutment surface 64d of the engagement projection 64, when the positioning hook 47 is moved in the circumferential direction by the rotation of the light emitting element mounting portion 24, the engagement projection 64 of the positioning member 28 is also pushed in the circumferential direction, whereby the positioning member 28 is also rotated.

Figure 16A:
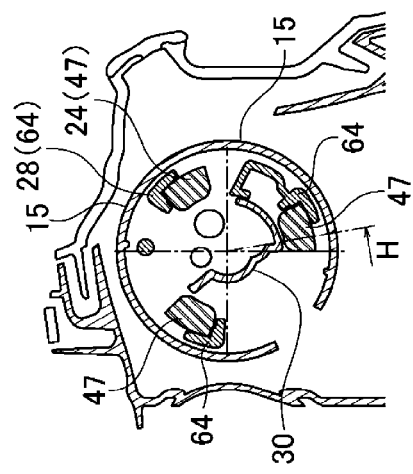
FIGS. 16A to 16C are schematic cross-sectional views illustrating the step illustrated in FIG. 11 in more detail.
Figure 16B:
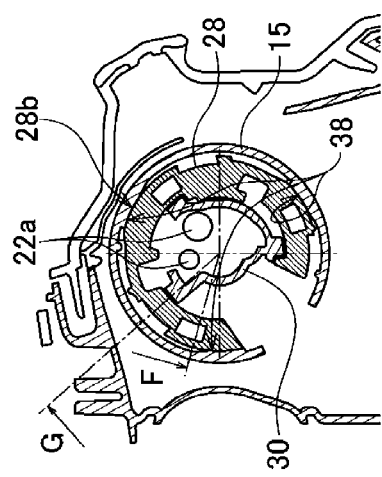
Figure 16C:
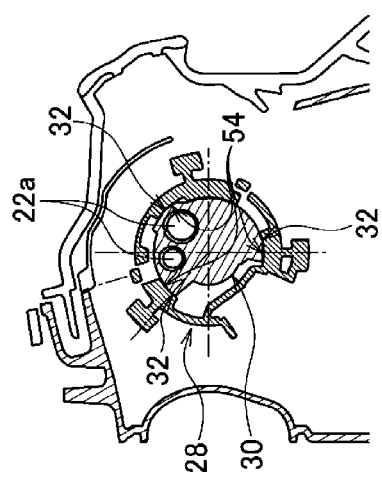
Figure 17A:
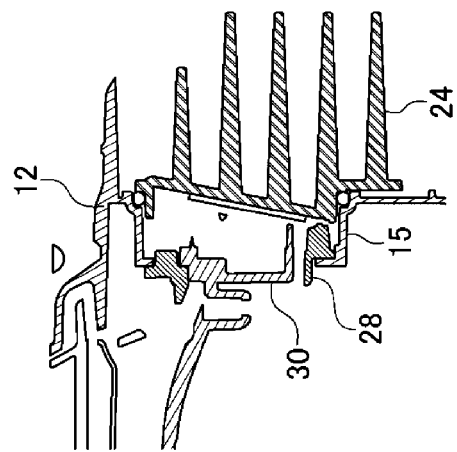
FIGS. 17A to 17C are schematic cross-sectional views illustrating the step illustrated in FIG. 11 in more detail.
Figure 17B:
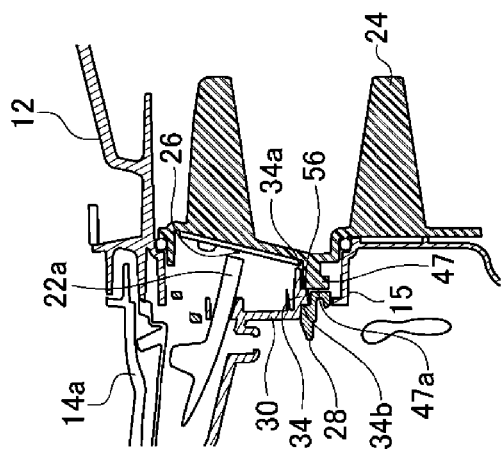
Figure 17C:
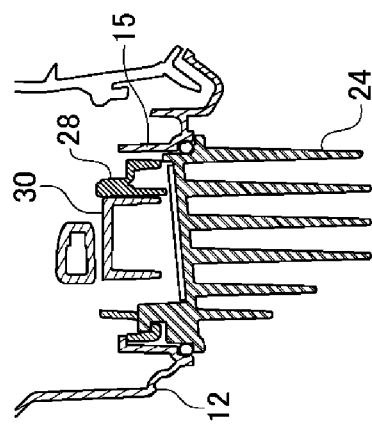

FIGS. 16A to 16C illustrate a cross-section taken along line A-A, a cross-section taken along line B-B, and a cross-section taken along line C-C in a state illustrated in FIG. 11, respectively. FIGS. 17A and 17B illustrate a cross-section taken along line F-F and a cross-section taken along line G-G in FIG. 16B, respectively, and FIG. 17C illustrates a cross-section taken along line H-H in FIG. 16C.

The positioning member 28 positions the light emitting element 26 and the positioning member 28 with respect to each other in the in-plane direction by the engagement with the light emitting element mounting portion 24, and positions the light guide light entrance portion 22a and the positioning member 28 with respect to each other by the engagement with the holder 30.

As understood from FIGS. 16A to 16C, when the light emitting element mounting portion 24 is rotated by the second angle, the in-plane direction positioning surface 32 of the holder 30 abuts on the in-plane direction positioning surface 54 of the positioning member 28. The in-plane direction positioning surface 32 of the holder 30 has a slightly larger radial dimension than the portion of the holder 30 adjacent in the circumferential direction. Therefore, the in-plane direction positioning surface 32 and the in-plane direction positioning surface 54 are in close contact, and the play between the holder 30 and the positioning member 28 is filled. In this way, the holder 30 and the positioning member 28 are positioned with respect to each other in the in-plane direction. At the same time, the outer peripheral surface of the second ring 28b of the positioning member 28 abuts on the in-plane direction positioning portion 38 of the light emitting element receiving port 15. The play between the light emitting element receiving port 15 and the positioning member 28 is filled, and the light emitting element receiving port 15 and the positioning member 28 are positioned with respect to each other in the in-plane direction.

The positioning member 28 is disposed in the light emitting element receiving port 15 so as to be rotated together with the light emitting element mounting portion 24, and abuts on the holder 30 so as to convert the rotational displacement of the positioning member 28 into the positional displacement of the light guide light entrance portion 22a in the optical axis direction.

When the light emitting element mounting portion 24 is rotated by the second angle, the optical axis direction positioning convex portion 34 of the holder 30 is guided along the inclined surface 58 of the positioning member 28, whereby the rotational displacement of the positioning member 28 is converted into the positional displacement in the optical axis direction of the holder 30. Then, finally, as illustrated in FIG. 17B, the lower surface 34b of the optical axis direction positioning convex portion 34 of the holder 30 abuts on the optical axis direction positioning surface 56 of the positioning member 28. The upper surface 34a of the optical axis direction positioning convex portion 34 abuts of the first positioning surface 47a of the positioning hook 47. Therefore, the optical axis direction positioning convex portion 34 is vertically sandwiched by the optical axis direction positioning surface 56 of the positioning member 28 and the positioning hook 47 of the light emitting element mounting portion 24. As a result, the holder 30 is positioned in the optical axis direction with respect to the light emitting element mounting portion 24.

Therefore, when light emitting element mounting portion 24 is mounted on the lamp body 12, the positioning member 28 is disposed between the light emitting element mounting portion 24 and the holder 30 in the light emitting element receiving port 15. The positioning member 28 is engaged with the light emitting element mounting portion 24 and the holder 30, respectively, and is locked to the lamp body 12 in the light emitting element receiving port 15. As a result, the positioning member 28 positions the light guide light entrance portion 22a in the in-plane direction and the optical axis direction with respect to the light emitting element 26.

As described above, according to the vehicle lamp 10 according to the embodiment, it is possible to accurately position the light emitting element 26 and the light guide 22 with respect to both of the in-plane direction and the optical axis direction, using the positioning member 28. In addition, the accurate positioning is completed by the simple attachment operation of rotating the light emitting element mounting portion 24 with respect to the lamp body 12.

In addition, according to the vehicle lamp 10 according to the embodiment, the external heat dissipating structure is provided. Therefore, for example, when a plurality of light emitting element 26 with high luminous flux are accumulated, the calorific value may be relatively large, but it is possible to favorably dissipate heat using the small heat dissipation portion 46c compared to the internal heat dissipation. In particular, although the second lamp unit 20 is provided in the upper part of the lamp chamber 16, the upper part of the lamp chamber 16 is more easily heated than the lower part. However, the adoption of the external heat dissipation facilitates thermal design to maintain an appropriate temperature environment in the vehicle lamp 10. In addition, excessive heating of the light guide light entrance portion 22a and possible damage that may occur as a result may be suppressed. The accumulation of the light emitting element 26 improves the appearance of lighting of the vehicle lamp 10. Miniaturization of the light emitting element mounting portion 24 also helps to implement a lamp design that is excellent in aesthetics. Since the light emitting element mounting portion 24 is detachable from the outside of the vehicle lamp 10, the serviceability is improved.

In the embodiment described above, the rod-shaped light guide 22 is described as an example. However, the positioning structure according to the embodiment may be applied to the positioning of the light entrance portions of other optical elements and the light emitting element 26. In addition, the positioning structure according to the embodiment is not limited to application to a headlamp, but is applicable to other vehicle lamps, such as a tail lamp, a turn lamp, and a stop lamp.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:
1. A vehicle lamp comprising:
 a lamp body including a light emitting source receiving port communicating with an outside of a lamp chamber;
 a translucent cover combined with the lamp body to form the lamp chamber in between;
 a light guide supported by the translucent cover, disposed in the lamp chamber, and including a light entrance portion disposed in the vicinity of the light emitting source receiving port;
 a light emitting source mounting portion mounted on the lamp body to close the light emitting source receiving port, and including a light emitting source disposed to face the light entrance portion;
 a holder that holds the light entrance portion; and
 a positioning ring including a lock disposed in the light emitting source receiving port to position the light entrance portion and the light emitting source with respect to each other in a state where the light emitting source mounting portion is mounted on the lamp body,
 wherein the positioning ring positions the light entrance portion and the light emitting source with respect to each other in a direction perpendicular to a light emitting surface of the light emitting source,
 wherein the light emitting source mounting portion is mounted on the lamp body by rotation around the perpendicular direction with respect to the light emitting source receiving port, and wherein the positioning ring is disposed in the light emitting source receiving port so as to be rotated around the perpendicular direction together with the light emitting source mounting portion, and abuts on the holder such that a rotational displacement of the positioning ring is converted into a positional displacement of the light entrance portion in the perpendicular direction.

2. The vehicle lamp according to claim 1, wherein the positioning ring positions the light entrance portion and the light emitting source with respect to each other in an in-plane direction parallel to a light emitting surface of the light emitting source.

3. The vehicle lamp according to claim 2,
wherein the positioning ring positions the light emitting source and the positioning ring with respect to each other in the in-plane direction by engagement with the light emitting source mounting portion, and positions the light entrance portion and the positioning ring with respect to each other by engagement with the holder.

4. The vehicle lamp according to claim 2, wherein the positioning ring positions the light entrance portion and the light emitting source with respect to each other in a direction perpendicular to a light emitting surface of the light emitting source.

5. The vehicle lamp according to claim 3, wherein the positioning ring positions the light entrance portion and the light emitting source with respect to each other in a direction perpendicular to a light emitting surface of the light emitting source.

6. The vehicle lamp according to claim 4,
wherein the light emitting source mounting portion is mounted on the lamp body by rotation around the perpendicular direction with respect to the light emitting source receiving port, and the positioning ring is disposed in the light emitting source receiving port so as to be rotated around the perpendicular direction together with the light emitting source mounting portion, and abuts on the holder such that a rotational displacement of the positioning ring is converted into a positional displacement of the light entrance portion in the perpendicular direction.

7. The vehicle lamp according to claim 5,
wherein the light emitting source mounting portion is mounted on the lamp body by rotation around the perpendicular direction with respect to the light emitting source receiving port, and the positioning ring is disposed in the light emitting source receiving port so as to be rotated around the perpendicular direction together with the light emitting source mounting portion, and abuts on the holder such that a rotational displacement of the positioning ring is converted into a positional displacement of the light entrance portion in the perpendicular direction.

8. The vehicle lamp according to claim 3, wherein the holder is bending-deformable with respect to the translucent cover.

9. The vehicle lamp according to claim 6, wherein the holder is bending-deformable with respect to the translucent cover.

10. The vehicle lamp according to claim 7, wherein the holder is bending-deformable with respect to the translucent cover.

11. A method of manufacturing a vehicle lamp, the method comprising:
providing a lamp body including a light emitting source receiving port communicating with an outside of a lamp chamber, a translucent cover that supports a light guide having a light entrance portion, a light emitting source mounting portion including a light emitting source, and a positioning ring including a lock;
attaching the translucent cover to the lamp body such that the lamp chamber is formed between the lamp body and the translucent cover, the light guide is disposed in the lamp chamber, and the light entrance portion is disposed in the vicinity of the light emitting element receiving port;
disposing the positioning ring in the light emitting source receiving port;
mounting the light emitting source mounting portion on the lamp body such that the light emitting source receiving port is closed and the light emitting source is disposed to face the light entrance portion;
rotating the light emitting source mounting portion with respect to the light emitting source receiving port and the positioning ring such that the light emitting source mounting portion is engaged with the positioning ring; and
further rotating the light emitting source mounting portion together with the positioning ring with respect to the light emitting source receiving port such that the light entrance portion and the light emitting source are positioned with respect to each other by the positioning ring,
wherein the mounting is performed such that the light entrance portion and the light emitting source are positioned with respect to each other by the positioning ring.

12. A vehicle lamp comprising:
a lamp body including a light emitting source receiving port communicating with an outside of a lamp chamber;
a translucent cover combined with the lamp body to form the lamp chamber in between;
a light guide supported by the translucent cover, disposed in the lamp chamber, and including a light entrance portion disposed in the vicinity of the light emitting source receiving port;
a light emitting source mounting portion mounted on the lamp body to close the light emitting source receiving port, and including a light emitting source disposed to face the light entrance portion;
a holder that holds the light entrance portion; and
a positioning ring including a lock disposed in the light emitting source receiving port to position the light entrance portion and the light emitting source with respect to each other in a state where the light emitting source mounting portion is mounted on the lamp body,
wherein the positioning ring positions the light entrance portion and the light emitting source with respect to each other in a direction perpendicular to a light emitting surface of the light emitting source,
wherein the light emitting source mounting portion is mounted on the lamp body by rotation around the perpendicular direction with respect to the light emitting source receiving port,
wherein the positioning ring is disposed in the light emitting source receiving port so as to be rotated around the perpendicular direction together with the light emitting source mounting portion, and abuts on the holder such that a rotational displacement of the positioning ring is converted into a positional displacement of the light entrance portion in the perpendicular direction, and wherein the holder is bending-deformable with respect to the translucent cover.

\* \* \* \* \*